(12) United States Patent
Miyajima

(10) Patent No.: US 11,085,794 B2
(45) Date of Patent: Aug. 10, 2021

(54) SURVEYING DEVICE

(71) Applicant: Topcon Corporation, Tokyo (JP)

(72) Inventor: Motohiro Miyajima, Tokyo (JP)

(73) Assignee: Topcon Corporation, Tokyo (JP)

( * ) Notice: Subject to any disclaimer, the term of this patent is extended or adjusted under 35 U.S.C. 154(b) by 0 days.

(21) Appl. No.: 16/964,188

(22) PCT Filed: Jan. 30, 2019

(86) PCT No.: PCT/JP2019/003085
§ 371 (c)(1),
(2) Date: Jul. 22, 2020

(87) PCT Pub. No.: WO2019/151292
PCT Pub. Date: Aug. 8, 2019

(65) Prior Publication Data
US 2021/0033422 A1  Feb. 4, 2021

(30) Foreign Application Priority Data

Jan. 31, 2018  (JP) .............................. JP2018-014494

(51) Int. Cl.
*G01C 25/00* (2006.01)
*G01C 11/02* (2006.01)

(52) U.S. Cl.
CPC ............ *G01C 25/005* (2013.01); *G01C 11/02* (2013.01)

(58) Field of Classification Search
None
See application file for complete search history.

(56) References Cited

U.S. PATENT DOCUMENTS 5,400,514 A    3/1995  Imbrie et al.
2010/0283840 A1* 11/2010  Belenkii ................. G01C 21/02
                                                348/61

(Continued)

FOREIGN PATENT DOCUMENTS

CH       709874 A2    1/2016
CN     105277181 A    1/2016

(Continued)

OTHER PUBLICATIONS

International Search Report and Written Opinion dated Apr. 23, 2019, in connection with International Patent Application No. PCT/JP2019/003085, filed Jan. 30, 2019, 8 pgs (with translation).

*Primary Examiner* — Heather R Jones
(74) *Attorney, Agent, or Firm* — Chiesa Shahinian & Giantomasi PC

(57) ABSTRACT

A surveying device 3 configured to perform a survey by tracking, as a survey target, a prism 13 attached to a camera 11 of a movable imaging device 2, includes an electronic distance meter 33 configured to measure a distance to the survey target; a horizontal angle detector 41 and a vertical angle detector 42 each configured to measure an angle; a main body 3a supporting these members; a time obtainer 47 configured to obtain a GPS time from a GPS satellite; a tilt sensor 48 configured to detect a posture of the main body 3a; a calibrator 49 configured to calibrate the tilt sensor 48; and a survey controller 40 that causes the calibrator 49 to perform calibration during a period in which the time obtainer 47 obtains the GPS time, as an advance preparation to be performed before the measurement.

3 Claims, 6 Drawing Sheets

(56) References Cited

U.S. PATENT DOCUMENTS

| | | |
|---|---|---|
| 2015/0220085 A1 | 8/2015 | Ohtomo et al. |
| 2016/0010985 A1 | 1/2016 | Ishida et al. |
| 2016/0049081 A1 | 2/2016 | Ohtomo et al. |
| 2017/0226708 A1 | 8/2017 | Fujimoto |
| 2017/0248948 A1 | 8/2017 | Otani et al. |
| 2019/0004157 A1* | 1/2019 | Kikuchi ................ G01S 7/4808 |
| 2019/0086206 A1* | 3/2019 | Nishita ................... G01S 17/89 |
| 2019/0302273 A1* | 10/2019 | Sano ....................... G01C 15/06 |
| 2021/0123735 A1* | 4/2021 | Komposch ........... G01C 15/008 |

FOREIGN PATENT DOCUMENTS

| | | |
|---|---|---|
| DE | 102015110684 A1 | 1/2016 |
| JP | H09-5080 A | 1/1997 |
| JP | 2015-145784 A | 8/2015 |
| JP | 2016-017875 A | 2/2016 |
| JP | 2017-142111 A | 8/2017 |
| JP | 2017-151008 A | 8/2017 |

* cited by examiner

TO S30 OF FIG. 6

SURVEYING DEVICE

CROSS-REFERENCE TO RELATED APPLICATIONS

This application is a national stage under 35 U.S.C. § 371 of International Patent Application No. PCT/JP2019/003085, filed Jan. 30, 2019, which claims priority to Japanese Patent Application No. 2018-014494, filed Jan. 31, 2018, the disclosure of both is incorporated herein by reference in its entirety.

TECHNICAL FIELD

The present disclosure mainly relates to a technique for advance preparation of a surveying device that performs a survey by tracking a moving object.

BACKGROUND ART

Traditionally, so-called stereographic photogrammetry has been known to be a method for surveying by using images (including still images and dynamic images) taken from two or more different positions by a camera mounted on a moving object.

Particularly in recent years, an Unmanned Air Vehicle (UAV: compact unmanned air vehicle) is used as the moving object to perform photogrammetry based on images taken from the sky with a camera mounted on the UAV (see Patent Document 1).

CITATION LIST

Patent Documents

PATENT DOCUMENT 1: Japanese Unexamined Patent Publication No. 2015-145784.

SUMMARY OF THE INVENTION

Technical Problem

In Patent Document 1, the position information of the UAV is surveyed by using a GPS or a surveying device (position measuring device) such as a total station. While a survey using a surveying device allows obtaining of more highly accurate position information than the GPS, it requires advance preparation before start using the surveying device, in order to perform an accurate survey. The advance preparation includes installation of the surveying device to a predetermined position, leveling work to match the axis of the device to the vertical direction of a set point, and calibration of a tilt sensor.

The photogrammetry such as the one described in Patent Document 1 also requires that the timing of taking an image by a camera on the UAV be synchronized with the timing of surveying by using the total station. To this end, for example, there is a method in which time information is obtained from a GPS satellite to match the time on the surveying device side with the time on the UAV side, in the advance preparation of the surveying device.

As should be understood, the surveying device requires various steps of work in the advance preparation before the device is used, and an improvement of work efficiency has been sought for. For example, if different application programs are used for executing leveling, calibration of the tilt sensor, obtaining of time information from the GPS satellite, and the like, the work to be done in advance will become complicated.

Particularly, in the step of obtaining time information from the GPS satellite and the step of calibrating the tilt sensor, the surveying device needs to be left still for a certain period of time. If the surveying device is moved after the tilt sensor is calibrated, the calibration needs to be done again, which leads to a lower work efficiency.

An embodiment of the present disclosure is conceived in view of the above problems, and it is an object of the embodiment of the present disclosure to provide a surveying device that improves work efficiency of advance preparation to be performed before a survey.

Solution to the Problem

To achieve the above object, a surveying device related to an embodiment of the present disclosure includes: a measurer capable of measuring at least one of a distance to a survey target and an angle of the survey target; a main body supporting the measurer; a time obtainer configured to obtain external time information; a posture detector configured to detect a posture of the main body; a calibrator configured to calibrate the posture detector; and a controller that causes the calibrator to perform calibration during a period in which the time obtainer obtains the time information, as advance preparation to be performed before the measurement by the measurer.

Further, the above-described surveying device may be such that the controller causes the time obtainer to obtain the time information and causes the calibrator to perform calibration in a latter half of the advance preparation.

Further, the above-described surveying device may be such that the controller provides guidance of each work in the advance preparation as a series of flow.

Advantages of the Invention

The embodiment of the present disclosure as described above improves work efficiency of advance preparation to be performed before a survey.

DESCRIPTION OF EMBODIMENTS

An embodiment of the present disclosure will be described in detail with reference to the drawings.

Figure 1:
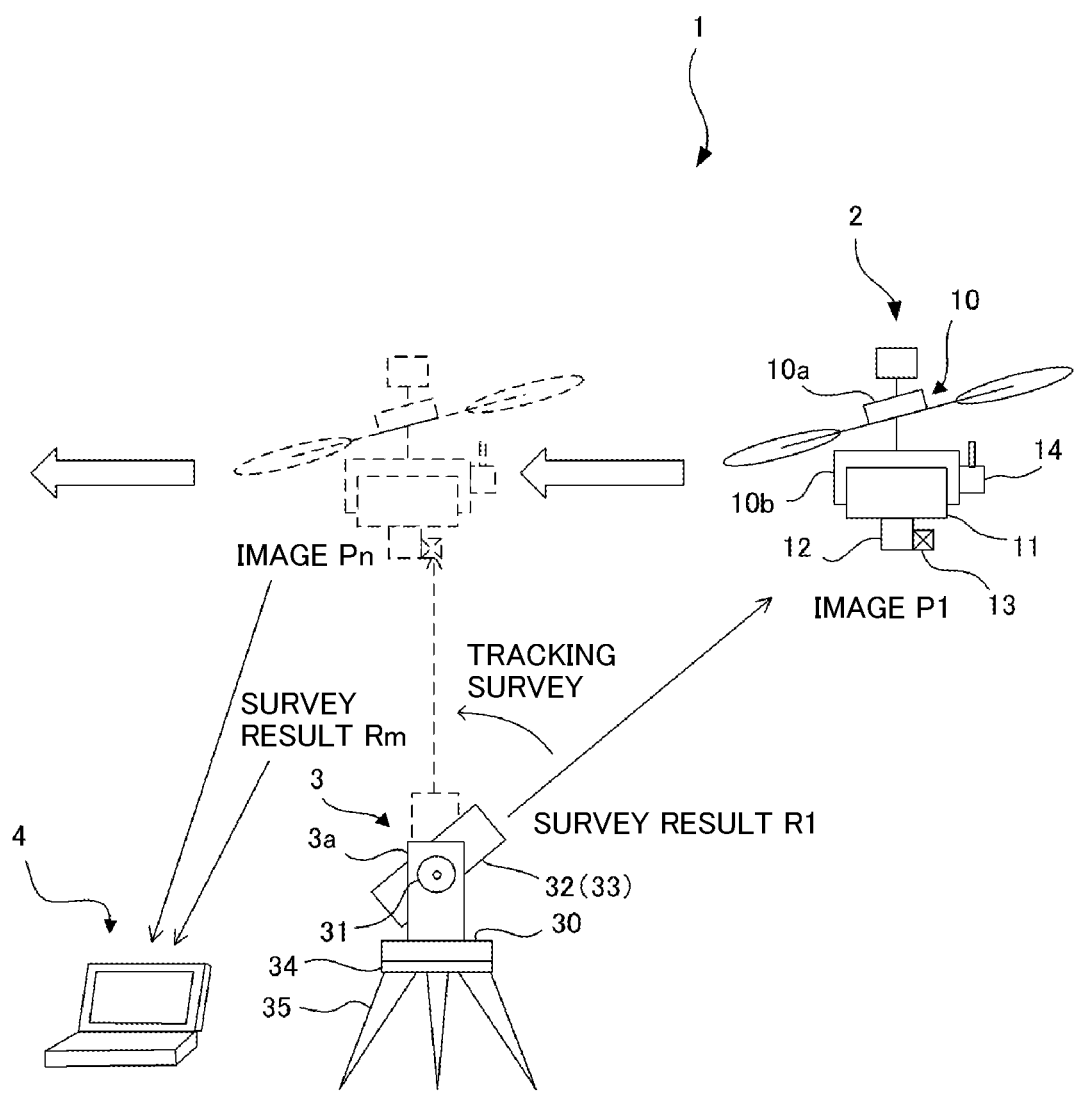
FIG. 1 is a diagram showing an overall configuration of a surveying system including a surveying device related to one embodiment of the present disclosure.
Figure 2:
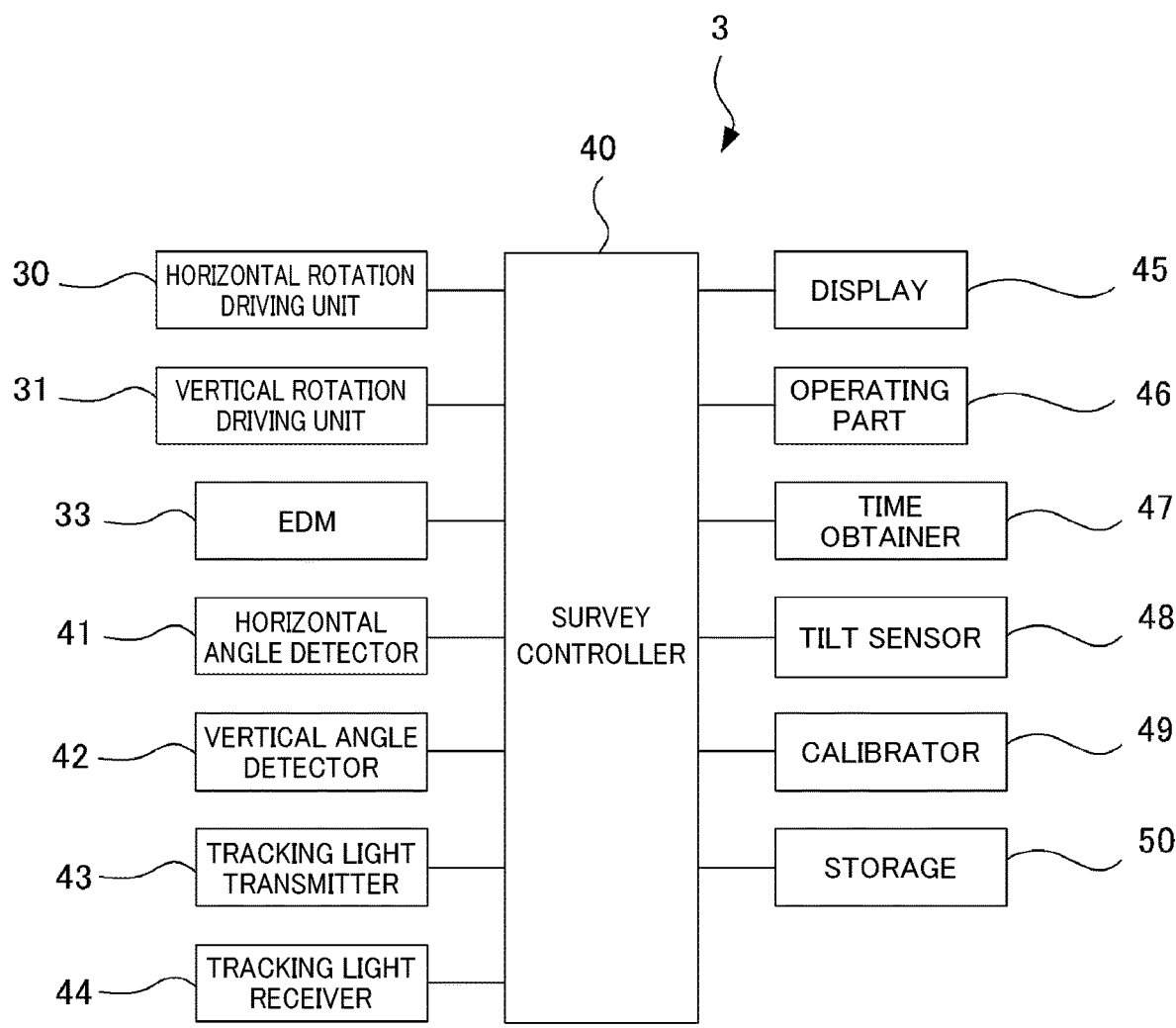
FIG. 2 is a control block diagram of the surveying device related to the embodiment of the present disclosure.

FIG. 1 is a diagram showing an overall configuration of a surveying system including a surveying device related to one embodiment of the present disclosure, and FIG. 2 is a control block diagram of the surveying device. The following describes a configuration of the present embodiment based on these figures.

A surveying system 1 is a surveying system that performs photogrammetry and includes a movable imaging device 2 configured to take a plurality of images for photogrammetry while moving, a surveying device 3 configured to survey a position of the movable imaging device 2, and an analyzing device 4 configured to analyze an imaging result and a survey result to generate data for photogrammetry.

The movable imaging device 2 is configured by mounting, on a UAV 10 which is a moving object, a camera 11 for taking images for photogrammetry. Images taken by the camera 11 may be still images or dynamic images.

More specifically, the UAV 10 is a flying moving object capable of flying a predetermined flight route or freely flying under remote control. To the UAV 10, a gimbal mechanism 10b is provided below a flying mechanism 10a for performing flight.

The camera 11 is supported by the gimbal mechanism 10b of the UAV 10. The gimbal mechanism 10b allows the direction in which images are taken to be freely changed, or stabilizes the posture of the camera 11 so that images are taken from a predetermined direction.

Further, the camera 11 has a lens unit 12 formed on a front surface of the main body, and a prism 13 arranged on a side of a distal end of the lens unit 12. The camera 11 further includes a GPS unit 14 capable of receiving GPS signals.

The surveying device 3 is a total station capable of automatically tracking a survey target, and its main body 3a includes a horizontal rotation driving unit 30 capable of driving rotation in a horizontal direction, and a telescope 32 provided through a vertical rotation driving unit 31 capable of driving rotation in a vertical direction. The telescope 32 further includes an electronic distance meter (EDM) 33 (measurer) configured to measure a slope distance to the target.

Specifically, the surveying device 3 is capable measuring the distance (distance surveying) from the surveying device 3 to the prism 13 and measuring the horizontal angle and the vertical angle, through a prism survey using the prism 13 as the survey target. Therefore, by surveying the prism 13 from the surveying device 3 installed at a known position or a station point calculated from another known point, the coordinates of the prism 13, i.e., the position of the camera 11 can be calculated based on the measurement results (the slope distance, the horizontal angle, and the vertical angle).

Further, a base 34 for the main body 3a of the surveying device 3 is placed on a tripod 35. Between the base 34 and the horizontal rotation driving unit 30, a leveler for adjusting (leveling) a tilt with respect to the base 34 is interposed. Although detailed illustration of the leveler is omitted, the leveler is, for example, one that includes leveling screws which support the main body 3a at three points on the base 34. Such a leveler adjusts the tilt of the horizontal rotation driving unit 30 with respect to the base 34 according to the tightening degree of each leveling screw. Note that the present embodiment deals with a case where the leveling screws are manually adjusted. However, the leveling screws may be drivable by an actuator such as a stepping motor so as to enable automatic leveling through the actuator.

The analyzing device 4 is an information processing terminal such as a personal computer which is capable of generating data for photogrammetry, by associating the survey result of a survey using the surveying device 3 with an imaging position of each image taken by the movable imaging device 2.

As shown in FIG. 1, with the surveying system 1, the movable imaging device 2 takes a plurality of images P1, P2 . . . Pn for photogrammetry at a predetermined imaging cycle ΔS while moving in the sky, and the surveying device 3 tracks the movable imaging device 2 (technically, the prism 13) and performs a survey. After imaging is completed, the analyzing device 4 generates data for photogrammetry by associating the images P1, P2 . . . Pn taken by the movable imaging device 2 with the survey results R1, R2 . . . Rm of surveys using the surveying device 3.

The surveying system 1 of the present embodiment associates the images P1 to Pn with the survey results R1 to Rm based on the GPS times that can be obtained from a GPS (Global Positioning System) Satellite. More specifically, for every image taken, the movable imaging device 2 adds to the image imaging time information based the GPS time. Meanwhile, every time the position of the movable imaging device 2 is surveyed, the surveying device 3 adds to the survey result survey time information based on the GPS time. After all the images are taken, the analyzing device 4 associates each image with a survey result given a survey time that matches with the imaging time of the image. This way, each accurate survey result obtained by a survey using the surveying device 3 is associated as the imaging position of the image. The analyzing device 4 then performs calculation based on photogrammetry using the images (data for photogrammetry) containing information of the imaging position.

In the above-described surveying system 1, the surveying device 3 has a survey controller 40 (controller) configured to control a survey by tracking the movable imaging device 2 and control advance preparation to be performed before the survey is performed.

FIG. 2 shows a configuration related to the survey controller 40 of the surveying device 3. As shown in the figure, in the surveying device 3, the survey controller 40 is connected to a horizontal angle detector 41 (measurer), a vertical angle detector 42 (measurer), a tracking light transmitter 43, a tracking light receiver 44, a display 45, an operating part 46, a time obtainer 47, a tilt sensor 48, a calibrator 49, and a storage 50, in addition to the above-described horizontal rotation driving unit 30, the vertical rotation driving unit 31, and the EDM 33.

The horizontal angle detector 41 detects the horizontal rotation angle by the horizontal rotation driving unit 30, so as to allow detection of the horizontal angle of a line to the point at which the telescope 32 is collimated. The vertical angle detector 42 detects the vertical rotation angle by the vertical rotation driving unit 31, so as to allow detection of the vertical angle of a line to the point at which the telescope 32 is collimated. With the horizontal angle detector 41 and the vertical angle detector 42, the horizontal angle and the vertical angle are each detected as the survey result.

The tracking light transmitter 43 emits tracking light, and the tracking light receiver 44 receives tracking light reflected on the prism 13. The survey controller 40 controls the horizontal rotation driving unit 30 and the vertical rotation driving unit 31 so that the tracking light receiver 44 keeps receiving the tracking light from the tracking light transmitter 43, thereby accomplishing a target tracking function.

The display 45 is, for example, a liquid crystal monitor and is capable of displaying guidance to each step of working in the advance preparation, and displaying various information such as a survey result (the slope distance, the horizontal angle, the vertical angle).

The operating part 46 enables input of characters and numbers in the advance preparation, and selection of "OK", "CANCEL", and the like. Note that the display 45 and the operating part 46 may be integrated with each other like a touch panel.

The time obtainer 47 has a function of receiving, from a GPS satellite, a GPS signal containing time information (hereinafter referred to as GPS time) and obtaining a GPS time. In the advance preparation, an operation of obtaining the GPS time is executed for a certain period of time (e.g., maximum of 20 min.) until time information is obtained from at least five GPS satellites.

The tilt sensor 48 (posture detector) is, for example, a sensor that detects an amount of movement of a bubble in a circular bubble tube. That is, the tilt sensor 48 is capable of detecting the posture of the surveying device 3, and more technically speaking, capable of detecting the tilt of the main body 3a of the surveying device 3 above the base 34, with respect to the horizontal plane.

The calibrator 49 is a part that calibrates the tilt sensor 48. Specifically, the calibrator 49 stores an offset amount detected by the tilt sensor 48 at the beginning of the advance preparation (tilt offset) and an offset amount at the latter half of the advance preparation (static tilt). The offset amount at the beginning of the advance preparation (tilt offset) is an average of offset amounts of the bubble from the center position of the circular bubble tube which are taken in an original and inverted postures. The offset amount in the latter half of the advance preparation (static tilt) is an offset amount of the bubble from the center position of the circular bubble tube.

The storage 50 is capable of storing a program for controlling a survey including the advance preparation, and various types of data such as text and numerical values input through the operating part 46, detected values and offset amounts from the tilt sensor 48, survey data including the GPS time, and the like.

After the surveying device 3 is installed in a given position, the survey controller 40 causes the calibrator 49 to perform a first calibration process (tilt offset) of the tilt sensor 48, performs leveling, installs the device, obtains the GPS time, and causes the calibrator 49 to perform a second calibration process (static tilt) of the tilt sensor 48, as the advance preparation before a survey by tracking the movable imaging device 2. As to the process of obtaining the GPS time and the second calibration process, the second calibration process by the calibrator 49 is started during a period of obtaining the GPS time. Further, the survey controller 40 is configured to provide guidance to each work of the advance preparation as a series of steps.

FIG. 3 to FIG. 6 are screen transition diagrams in the advance preparation of the present embodiment, and the steps of the advance preparation for the surveying device are described hereinbelow with reference to these figures. The screens shown in the screen transition diagrams of FIG. 3 to FIG. 6 are screens displayed on the display 45.

After the surveying device 3 is installed, the advance preparation is started by starting a surveying application program. First, as shown on the screen S1 of FIG. 3, the survey controller 40 notifies that the first calibration process (tilt offset) as the first step of the advance preparation is started. More specifically, on the screen S1, the first calibration process is referred to as "tilt offset configuration", and "YES" and "NO" are displayed to allow an operator to choose whether to execute the first calibration process. The operator selecting "YES" causes a transition to the subsequent screen S2. On the other hand, when "NO" is selected, the process returns to, for example, the initial screen.

On the screen S2, the survey controller 40 displays the progress status of the first calibration process. While this display is taking place, the survey controller 40 waits for a certain period of time, and obtains the value of the tilt sensor 48 after the bubble in the circular bubble tube stops. Then, the survey controller 40 causes the horizontal rotation driving unit 30 to invert the main body 3a of the surveying device 3 by 180° in a horizontal direction. After that, the survey controller 40 once again waits for a certain period of time and then obtains the value of the tilt sensor 48, and once again inverts the main body 3a by 180° to return the main body 3a to original posture. The values of the tilt sensor 48 obtained at this time are stored as offset amounts in the storage 50. Note that the offset amounts in both the original posture and the inverted posture may be stored in this case, or the average value of both values may be calculated and stored.

In the subsequent screen S3, the survey controller 40 displays a screen with an instruction on a leveling work for the operator, and displays in the next screen S4 an image of the circular bubble tube and angles of the X direction and the Y direction. The image of the circular bubble tube displayed on the screen S4 corresponds to the tilt sensor 48, and the operator performs leveling work by adjusting the leveling screws in such a manner as to bring the bubble in the image closer to the center position. When the angles of X-axis and the Y-axis each perpendicular to the horizontal plane are within 30 arcseconds, an ENT key on the operating part 46 is pressed to cause a transition to the subsequent screen S5.

On the screen S5, the survey controller 40 prompts the operator to select a method for installing the device. The present embodiment allows selection of an installation method from two methods, i.e., a method for a case of having the surveying device 3 installed at a known point, and a method for a case where the surveying device 3 is not installed at a known point and a station point is to be calculated by a backward intersection method.

The "AT KNOWN POINT" on the screen S5 is selected when the surveying device 3 is installed at a known point. Doing so causes a transition to the screen S10 shown in FIG. 4.

Figure 4:
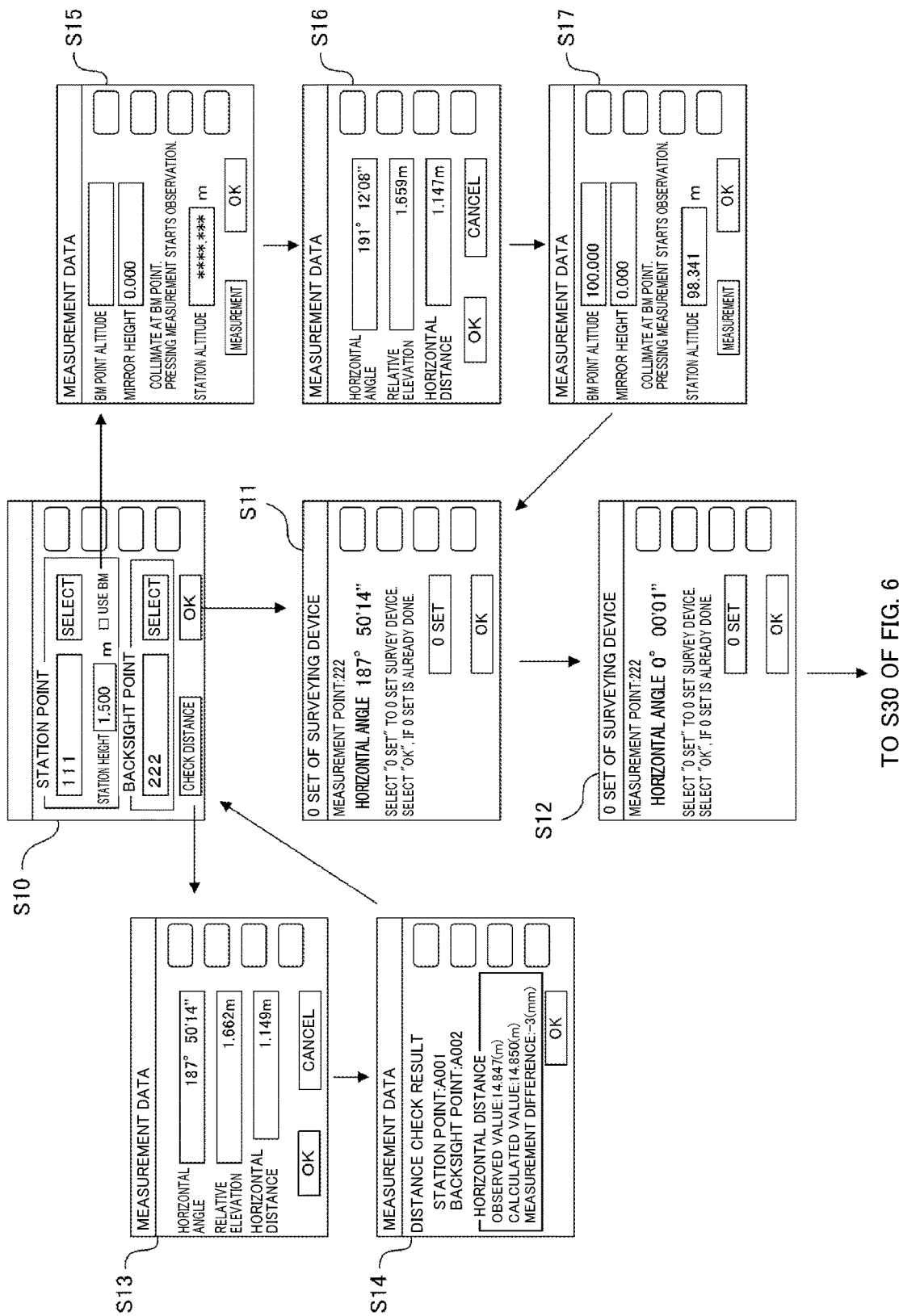
FIG. 4 is a screen transition diagram of a known point setting in the advance preparation related to the embodiment.

On the screen S10 shown in FIG. 4, the survey controller 40 mainly prompts selection of information regarding the station point and information regarding a backsight point. Regarding the information of the station point and the information of the backsight point, for example, the storage 50 stores in advance information of known points around the survey point. Pressing a "SELECT" button on the screen S10 displays a list of information and allows selection of a suitable known point from the list. Further, an input of device height is enabled as needed. The operator pressing an "OK" button after inputting various information causes a transition to the screen S11.

On the screen S11, the survey controller 40 displays the horizontal angle at this point of a line from the surveying device 3 to the backsight point. The operator pressing a "0 SET" button causes a transition to the subsequent screen S12 and the survey controller 40 sets the horizontal angle at this time of a line from the surveying device 3 to the backsight point to 0. Then, the operator pressing the "OK" button causes a transition to a screen S30 shown in FIG. 6.

Further, the screen S10 has a selectable "CHECK DISTANCE" button, which measures the distance from the surveying device 3 to the backsight point. When the operator presses the "CHECK DISTANCE" button after the surveying device 3 is collimated at the backsight point, the horizontal angle and the relative elevation of the backsight point, and the horizontal distance to the backsight point are measured by measurers of the surveying device 3 as shown on the screen S13. Pressing the "OK" button here causes a transition to the screen S14 and an observed value of the distance to the backsight point resulting from the actual observation, a calculated value based on information of the backsight point stored in advance, and the measurement difference between the observed value and the calculated value are calculated. Pressing again the "OK" button will cause the screen to return to the screen S10.

Further, the screen S10 has a "USE BM" checkbox for using a BM (bench mark point) as the information of the station point. Pressing the "OK" button with this checkbox checked causes a transition to the screen S15 and an input screen is displayed for entering the altitude of the BM point, the mirror height of the surveying device 3, and the altitude of the station.

Then, when the operator collimates the surveying device 3 at the BM point and presses a "MEASURE" button, the survey controller 40 measures the horizontal angle and the relative elevation of the BM point with respect to the surveying device 3, and the horizontal distance of the surveying device 3 from the BM point. After that, a transition to the screen S16 takes place and the survey controller 40 displays the measurement results. Pressing the "OK" button at this time causes a transition to the screen S17.

On the screen S17, the survey controller 40 displays the values of the altitude of the BM point and the altitude of the station not having been entered in S15, based on the measurement results displayed on the screen S16. Pressing the "OK" button at this time causes a transition to the above-described screen S11. The process thereafter is as hereinabove described.

Figure 3:
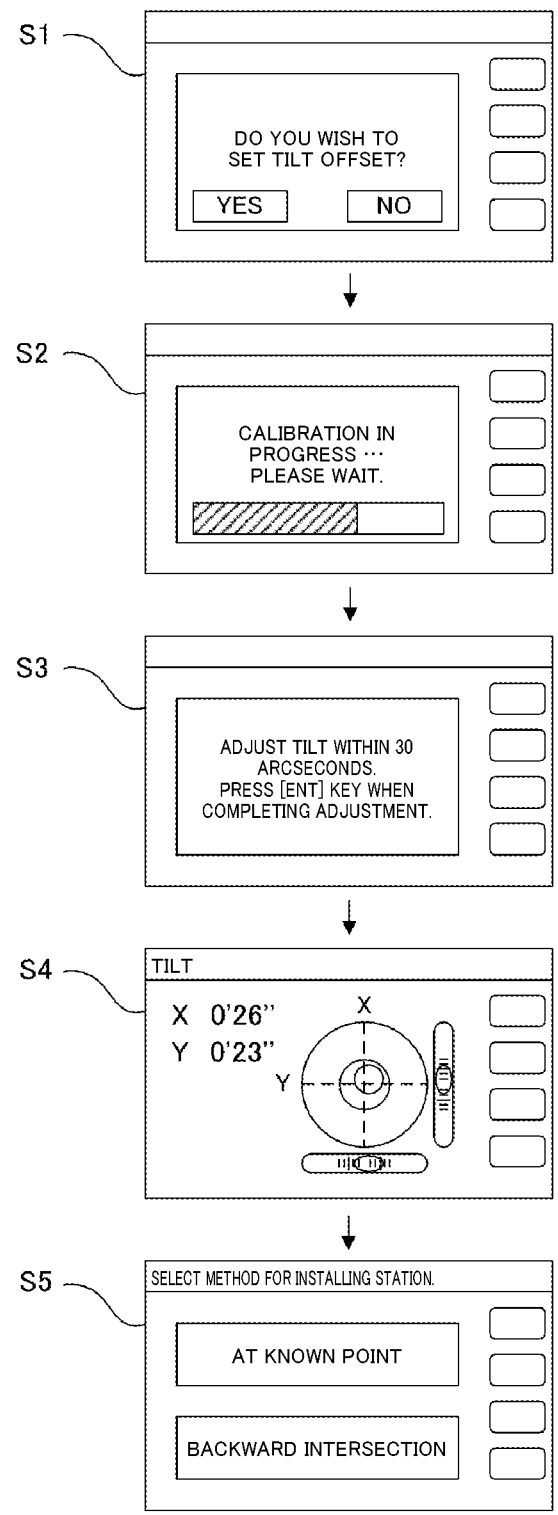
FIG. 3 is a screen transition diagram of an initial setting in advance preparation related to the embodiment.
Figure 5:
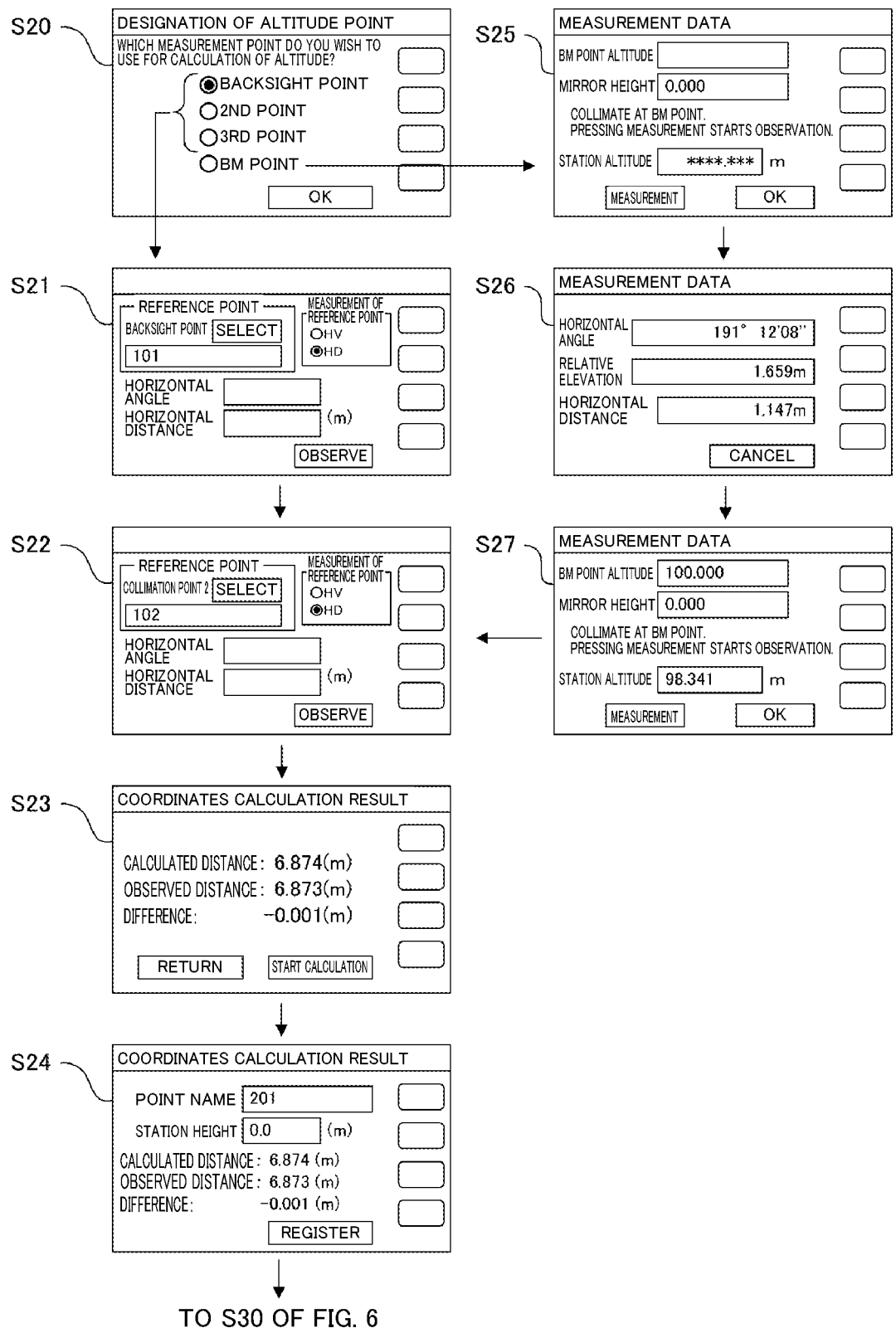
FIG. 5 is a screen transition diagram of a backward intersection setting in the advance preparation related to the embodiment.

Meanwhile, selecting the "BACKWARD INTERSECTION" in the screen S5 shown in FIG. 3 causes a transition to the screen S20 shown in FIG. 5.

In the screen S20 of FIG. 5, the survey controller 40 asks which point out of the backsight point (a first point), a second point, a third point, and the BM point will be used in calculation of the altitude in the backward intersection method. Selecting a point other than the BM point and pressing the "OK" button will cause a transition to the screen S21.

On the screen S21, the survey controller 40 prompts selection of a backsight point to serve as a first reference point. When the surveying device 3 is collimated at the selected backsight point and when the "OBSERVE" button is pressed, the backsight point is measured from the surveying device 3.

Further, in the subsequent screen S22, the survey controller 40 prompts selection of a collimation point 2 to serve as a second reference point. When the surveying device 3 is collimated at the selected collimation point 2 and when the "OBSERVE" button is pressed, the collimation point 2 is measured from the surveying device 3.

Then, on the subsequent screen S23, the survey controller 40 displays a calculated distance between the backsight point and the collimation point 2, the observed distance between the backsight point and the collimation point 2 based on observation values thereof, and the calculated difference between the calculated distance and the observed distance.

After that, on the screen S24, the survey controller 40 displays the coordinates of the station point calculated based on the backward intersection method and prompts an entry of the point name for the station point. Entering the point name and pressing a "REGISTER" button thereafter stores the information of the station point in the storage 50 and causes a transition to the screen S30 shown in FIG. 6.

While the above description deals with a case of calculating the station point from two known points, the station point may be calculated from three known points. Further, the screens S25 to S27 in cases of selecting the BM point in the screen S20 are similar to the screens S15 to S17 described above, therefore further description is omitted for these screens.

Figure 6:
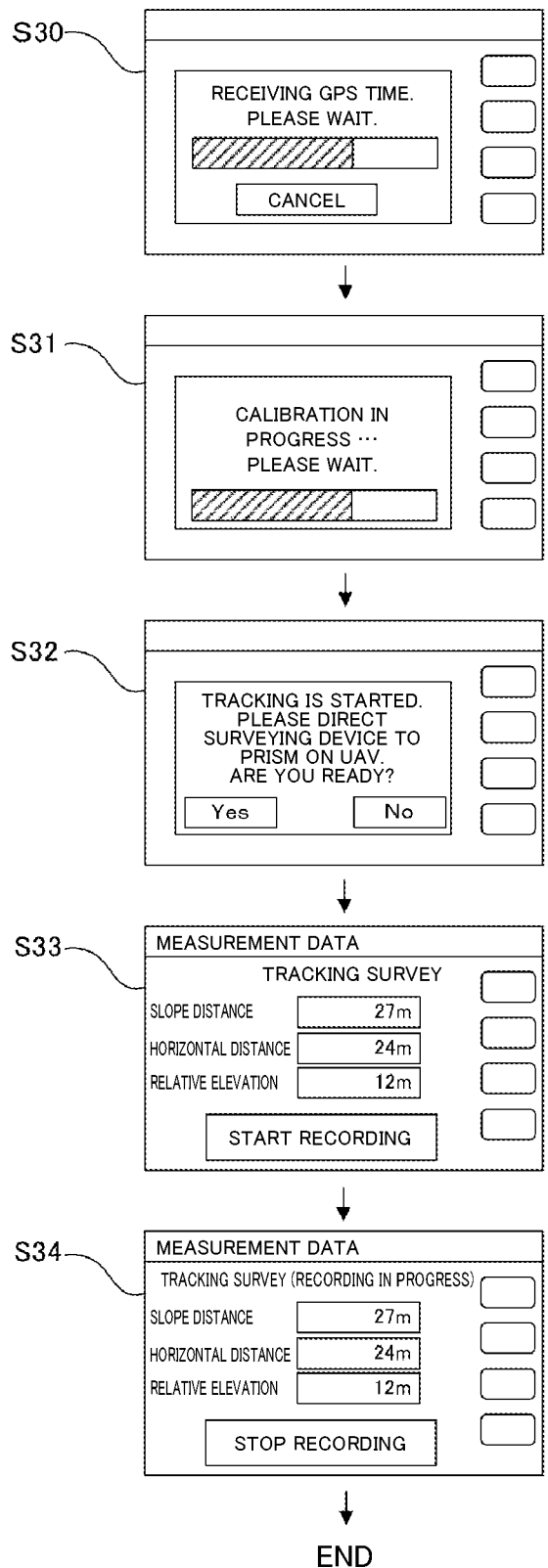
FIG. 6 is a screen transition diagram of a final setting in the advance preparation related to the embodiment.

When the above-described setting of the station point, as shown in FIG. 4 or FIG. 5 is completed, a transition to the screen S30 shown in FIG. 6 takes place.

On the screen S30 shown in FIG. 6, the survey controller 40 causes the time obtainer 47 to obtain a GPS time. More specifically, the screen S30 displays the progress status of obtaining the GPS time. The survey controller 40, during this display is taking place, causes the time obtainer 47 to receive GPS signals. The process of obtaining the GPS times is completed when GPS signals are received from at least a predetermined number (e.g., five) of GPS satellites. Then, a transition to the subsequent screen S31 takes place.

On the screen S31, the survey controller 40 displays the progress status of the second calibration process. In the second calibration process (static tilt), the survey controller 40 causes the calibrator 49 to start processing before a transition to the screen S31, i.e., during the period of obtaining the GPS time. Specifically, the calibration process waits for a certain period of time to have the bubble in the circular bubble tube to stop. Then, the value of the tilt sensor 48 is obtained and the value is stored as an offset amount in the storage 50. In short, the second calibration process does not invert the surveying device 3, which is done in the first calibration process.

If the second calibration process is not completed during the period of obtaining the GPS time, the survey controller 40 displays the remaining progress status of the second calibration process on the screen S31. On the other hand, if the second calibration process is completed during the period of obtaining the GPS time, the screen S31 is displayed for a shortest period of time and the screen swiftly transits to the subsequent screen S32.

On the screen S32, the survey controller 40 notifies that tracking of the prism 13 attached to the camera 11 of the movable imaging device 2 is to be started. Tracking is started when the operator orients the surveying device 3 to the prism 13 and when the survey controller 40 recognizes the prism 13. Then, pressing "YES" on the screen S32 causes a transition to the subsequent screen S33.

The survey controller 40 periodically measures the slope distance and the horizontal distance from the surveying device 3 to the prism 13 and the relative elevation of the prism 13 with respect to the surveying device 3. The measurement results are displayed on the screen S33. Then, for example, the operator pressing a "START RECORDING" button immediately before the movable imaging device 2 starts taking images causes a transition to the subsequent screen S34.

The survey controller 40 stores, in the storage 50, the measurement results obtained from the measurement periodically performed by the surveying device 3 while displaying the measurement results on the screen S34. When imaging by the movable imaging device 2 is all completed and when the operator presses a "STOP RECORDING", the survey by the surveying device 3 is ended.

As hereinabove described, the surveying device 3 of the present embodiment performs the first calibration process, the processes of leveling, installing the station, obtaining the GPS time, the second calibration process, and the like under control of the survey controller 40, as the advance preparation for a survey by tracking the movable imaging device 2. As to the process of obtaining the GPS time and the second calibration process, the second calibration process by the calibrator 49 is started during the period of obtaining the GPS time by the time obtainer 47. The operator typically keeps the surveying device 3 still during the period of obtaining the GPS time. Therefore, this period is suitable for calibration process of the tilt sensor 48 and allows the calibration process to be stably performed. Further, the time taken for the calibration process is reduced by overlapping execution of the second calibration process with the process of obtaining the GPS time.

Further, the second calibration process is executed in the latter half of the advance preparation, i.e., in the step immediately before the surveying device 3 starts tracking the prism 13 in the present embodiment. Therefore, it is very unlikely that the surveying device 3 changes its posture after the calibration process. Therefore, unnecessary work such as redoing the calibration process is avoidable.

Further, in the advance preparation of the survey controller 40 of the present embodiment, there is no need for starting another application program and the like, and the steps up to the start of a survey by tracking are given guidance as a series of flow as shown in the screen transition diagrams of FIG. 3 to FIG. 6. The operator therefore simply has to complete each step by simple operations on various buttons according to the guidance shown on the screens.

As should be understood, the surveying device 3 of the present embodiment improves the work efficiency in the advance preparation performed before a survey.

Thus, one embodiment of the present disclosure has been described hereinabove. However, the present disclosure is not limited to the embodiment described above.

The above embodiment deals with a case where the movable imaging device 2 adopts a UAV 10 as a moving object. However, the moving object is not limited to this, and may be, for example, a moving object that moves on land such as automobiles, humans, and the like.

Further, the above embodiment deals with a case where the time obtainer 47 obtains the GPS times from the GPS satellites. However, the time information to be obtained is not limited to a GPS time. For example, the present disclosure is also applicable to a configuration that obtains time information given from a GNSS (Global Navigation Satellite System) or time information obtained in the form of standard waves for use in atomic clocks.

DESCRIPTION OF REFERENCE CHARACTERS

1 Surveying System
2 Movable Imaging Device
3 Surveying Device
3a Main Body
4 Analyzing Device
10 UAV
11 Camera
14 GPS UNIT
30 Horizontal Rotation Driving Unit
31 Vertical Rotation Driving Unit
33 Electronic Distance Meter (EDM) (Measurer)
40 Survey Controller (Controller)
41 Horizontal Angle Detector (Measurer)
42 Vertical Angle Detector (Measurer)
45 Display
46 Operating Part
47 Time Obtainer
48 Tilt Sensor (Posture Detector)
49 Calibrator

The invention claimed is:

1. A surveying device, comprising:
    a measurer capable of measuring at least one of a distance to a survey target and an angle of the survey target;
    a main body supporting the measurer;
    a time obtainer configured to obtain external time information;
    a posture detector configured to detect a posture of the main body;
    a calibrator configured to calibrate the posture detector; and
    a controller that causes the calibrator to perform calibration during a period in which the time obtainer obtains the time information, as advance preparation to be performed before the measurement by the measurer.

2. The surveying device of claim 1, wherein the controller causes the time obtainer to obtain the time information and causes the calibrator to perform the calibration in a latter half of the advance preparation.

3. The surveying device of claim 1, wherein the controller provides guidance of each work in the advance preparation as a series of flow.

* * * * *